Figure 1:
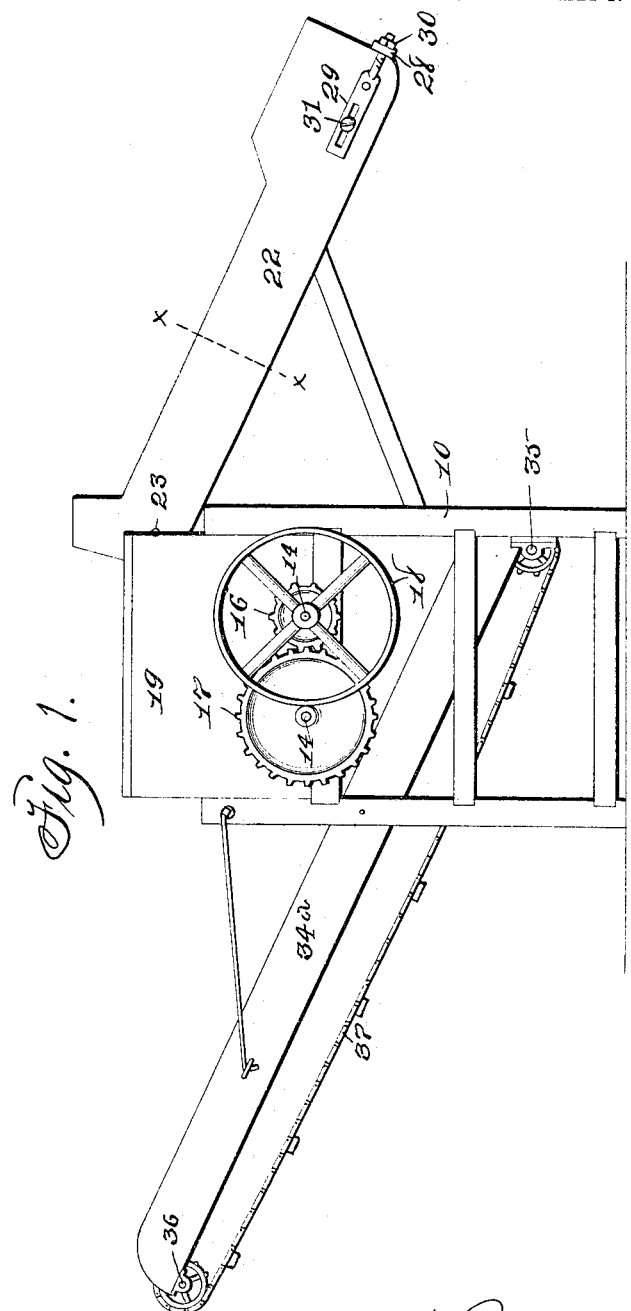

No. 769,635. PATENTED SEPT. 6, 1904.
J. M. RANKIN.
MACHINE FOR CRUSHING EARS OF CORN FOR FEED.
APPLICATION FILED OCT. 19, 1903.
NO MODEL. 2 SHEETS—SHEET 1.

Witnesses: R. C. Orwig. H. Manger.
Inventor: James M. Rankin,
By Thomas C. Orwig, Attorney.

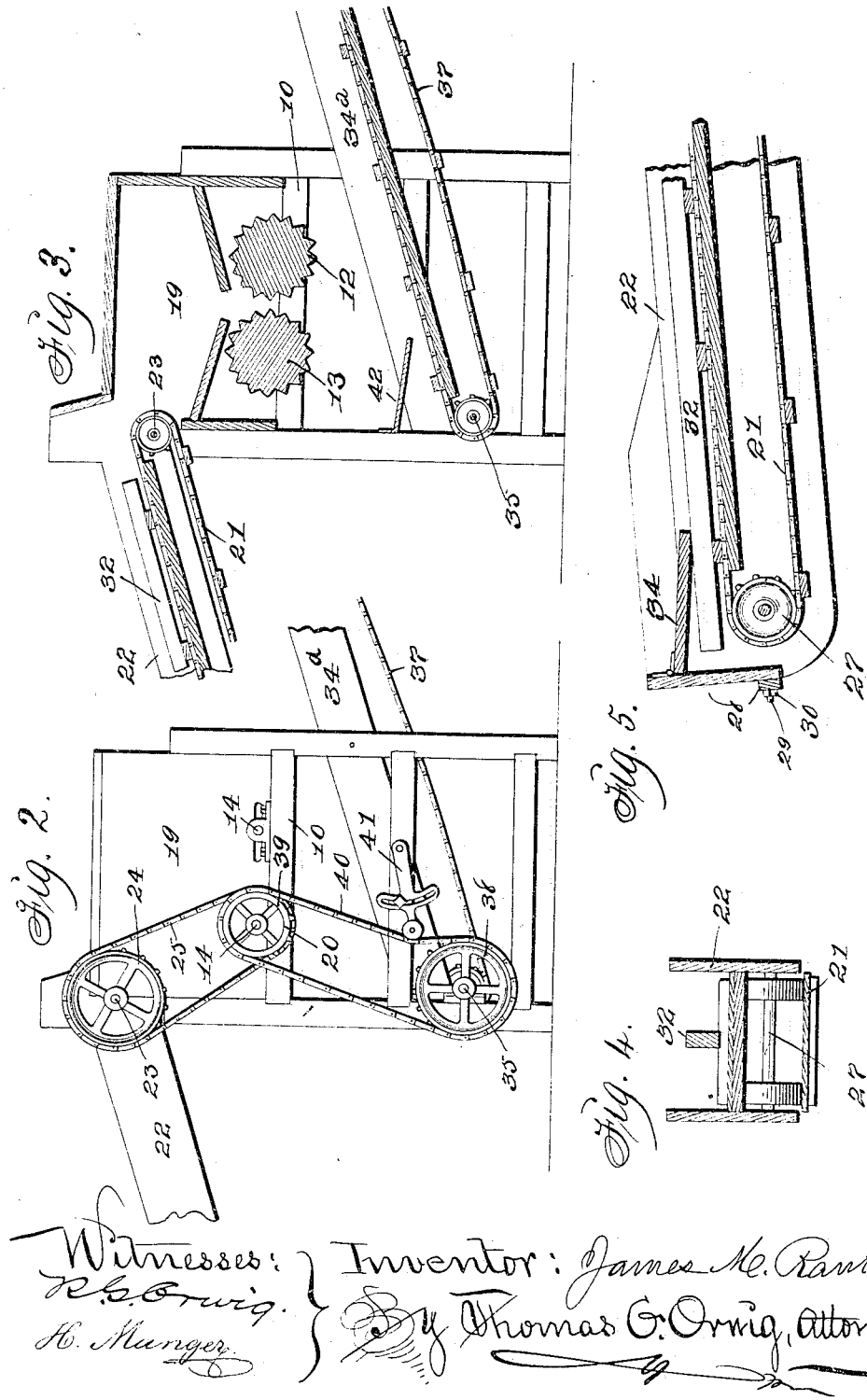

No. 769,635.

Patented September 6, 1904.

UNITED STATES PATENT OFFICE.

JAMES M. RANKIN, OF IOWA FALLS, IOWA.

MACHINE FOR CRUSHING EARS OF CORN FOR FEED.

SPECIFICATION forming part of Letters Patent No. 769,635, dated September 6, 1904.

Application filed October 19, 1903. Serial No. 177,714. (No model.)

*To all whom it may concern:*

Be it known that I, JAMES M. RANKIN, a citizen of the United States, residing at Iowa Falls, in the county of Hardin and State of Iowa, have invented a new and useful Machine for Crushing Ears of Corn for Feed, of which the following is a specification.

My object is to provide a simple, strong, durable, and portable machine specially adapted for crushing and comminuting ears of corn to simultaneously reduce the cobs to small particles corresponding with small and broken kernels to produce feed adapted to be advantageously stored, handled, and fed to animals and the cobs, that are usually considered a waste product, utilized as feed as well as the kernels.

A further object is to produce a machine that will automatically convey corn up in an elevator to feed it into a hopper, reduce it to feed, and automatically convey the feed up from below the hopper and rollers into a receptacle at some distance from the machine.

My invention consists in the construction, arrangement, and combination of elements and subcombinations, as hereinafter set forth, pointed out in my claims, and illustrated in the accompanying drawings, in which—

Figure 1 is a side elevation of the machine and shows the differential gearing for rotating two parallel crushing-rollers simultaneously at different speed. Fig. 2 is a side elevation that shows the connections between the crushing-rollers, the endless carriers for conveying ears of corn to the crushing-rollers, and an endless carrier for conveying the reduced cobs mixed with kernels away from the machine. Fig. 3 is a vertical longitudinal sectional view that shows the relative positions of the interior operative parts. Fig. 4 is a transverse sectional view of the conveyer on the line *x x* of Fig. 4 for carrying corn in the ear to the crushing-rollers. Fig. 5 is a sectional view of the lower end of the conveyer.

The numeral 10 designates the frame of the machine, preferably made of hard wood, and may vary in size, as desired. Crushing-rollers 12 and 13 of uniform size are mounted in bearings fixed to cross-pieces at the top of the frame. One of them has adjustable bearings, so it can be adjusted relative to the other roller in parallel position therewith as required to regulate the size of particles to which cobs are to be reduced. Each roller has a corrugated surface, preferably in the form of ribs, that extend spirally from end to end. The rollers are preferably solid cast metal about two feet long and nine inches in diameter and provided with journals 14 at their ends. They are preferably provided with annular ribs or cutters 15, as shown in Fig. 3, for cutting ears of corn transversely before crushing them. By providing a roller with annular sharp-edged ribs and having their edges in alinement with the edges of the longitudinal ribs they cut ears of corn transversely and into short length and greatly facilitate reducing the corn and cob into small particles. The rollers 12 and 13 are connected by means of two gear-wheels 16 and 17, that differ in diameter, as shown in Fig. 4 and as required to rotate them at different speed. The gear-wheel 16 is about one-third the diameter of the wheel 17. These wheels are fixed to the axles or journals of the rollers 14, and a band-wheel 18 is fixed to the same roller 13, to which the small gear-wheel 16 is fixed, as shown in Fig. 4.

A hopper 19 is fixed on top of the frame 10 and over the rollers 12 and 13, as required, for feeding ears of corn to the rollers by means of a conveyer. A sprocket-wheel 20 is fixed on the axle or journal of the roller 13, as shown in Fig. 5, to transmit power and motion from the roller 13 to an endless carrier 21 in a conveyer-trunk 22, fixed to the hopper 19, as required, for elevating corn into the hopper when the machine is in operation. The roller-shaft 23, mounted in the top end portion of the trunk 22, has a sprocket-wheel 24 on its end, and a chain 25 on the wheels 20 and 24 connects the roller 13 with the roller-shaft 23, as required, to operate an endless carrier 21 on the roller-shaft 23 and a roller 27, mounted in the lower end of the trunk 22. The two endless carriers 21 and 26 are thus advantageously connected with the roller 13 to coact with the pair of rollers in performing the function of the machine which is to automatically convey ears of corn into the machine, reduce it to feed, and automatically convey the feed from the machine.

A bar 28 is fixed across the lower end of the trunk 22 and provided with apertures, through which the screw-threaded ends of adjustable bearers 29 are extended, and nuts 30 placed on said ends in such a manner that the bearers can be moved longitudinally, as required, to regulate the tension of the endless carrier 21. Slots in the sides of the trunk 22 allow the journals of the roller-shaft 27 to slide in their slots, and slots in the ends of the bearers, through which screws 31 are extended into the wood, as shown in Fig. 4, allow the bearers 29 to slide when the nuts 30 are operated to move the roller-shaft 27, as required, in adjusting the bearers for regulating the tension of the endless carrier. A straight bar 32 is fixed in the trunk 22 to extend from one near the lower end to the upper end portion for separating the ears of corn into two parallel columns or lines as they are carried upward on the carrier 21 and to support a deflector at the lower end of the conveyer in a plane above the carrier, and a deflector 34 is pivotally connected with the lower end of the trunk 22 to prevent ears of corn from dropping into the lower end of the trunk to clog the carrier 21. The lower end of the conveyer-trunk is thus adapted for use as a hopper into which corn can be shoveled from a wagon to be conveyed up into the hopper by the endless carrier that moves upward under the deflector.

To convey the comminuted cobs and the shelled and broken corn from the machine to a wagon or other suitable receptacle at the side of the machine, a conveyer-trunk 34ª is fixed in the frame 10 to project upward and a roller-shaft 35, mounted in bearings fixed to the frame, and a roller-shaft 36, mounted in the upper end of the trunk, and an endless carrier 37, placed on said roller-shafts. A sprocket-wheel 38 is fixed to the shaft 35 and a smaller one, 39, to the axle or journal of the crushing-roller 13, and a chain 40 placed on said sprocket-wheels 38 and 39, as required, to actuate the endless carrier 37. A device 41 is adjustably connected with the frame 10 for regulating the tension of the chain 40. A flexible apron 42 is fixed to the frame 10 to project over the lower end of the carrier 37, as required, to prevent ears of corn from clogging the carrier. The endless carrier 37 is adapted for elevating the particles without dropping along the line of advance.

In the practical operation of the machine husked ears of corn are shoveled or otherwise fed to the lower end of the conveyer in the trunk 22 and carried up to fall from the top of the endless carrier 21 into the hopper 19 and upon the parallel husking-rollers 12 and 13, that rotate toward each other. The roller 13 rotates at a comparatively slow speed relative to the roller 12 and practically serves as a concave in a threshing-machine for holding and resisting the passage of ears of corn and pieces of ears, while at the same time the roller 12, rotating at a greater speed, performs the function of a toothed cylinder in a thresher in striking and breaking and reducing the cobs into small particles to mingle with the kernels, so they will drop down between the rollers upon the endless carrier 37 to be conveyed thereby to a receptacle at the outer end of the conveyer.

It is obvious that combining the endless carriers with the crushing-rollers the rollers and the carriers coact as required to feed corn to the machine and also to convey the finished product of the machine away therefrom. The carrier at the top of the machine and inclined downward therefrom is in proper position for shoveling corn thereon from a wagon and conveying it into the hopper, and the other carrier that extends upward from below the rollers is in proper position for conveying the finished product of the machine into sacks or a wagon placed under its upper end.

Having thus described the purpose of my invention and the construction, arrangement, combination, and operation of all the parts, its practical utility will be readily understood by persons familiar with the art to which it pertains.

What I claim as new, and desire to secure by Letters Patent, is—

1. In a machine for reducing ears of corn to small particles, a pair of rollers for cutting and crushing the corn, a hopper above the rollers, a conveyer-trunk fixed to the hopper to extend downward, a bar fixed in the center of said conveyer-trunk to extend from near the lower end to its top portion, a deflector made of rigid material pivotally connected with the lower end of the trunk to extend upward over said fixed bar and an endless carrier mounted in the trunk to move under said fixed bar and said pivoted deflector, all arranged and combined with a frame to operate in the manner set forth for the purposes stated.

2. A machine for reducing ears of corn to small particles, comprising a frame, two rollers adapted for crushing and cutting corn mounted in parallel position, a hopper above the rollers, a conveyer-trunk fixed to the hopper above the rollers to extend downward, a bar fixed in the center of said conveyer-trunk to extend from near the lower end to its top portion, a deflector made of rigid material pivotally connected with the lower end of said trunk to extend upward over said fixed bar, an endless carrier in said trunk to move under the deflector, a second conveyer-trunk fixed to the frame under the rollers to extend upward, an endless carrier in the said second conveyer-trunk and mechanism for simultaneously operating the rollers and the endless carriers, as shown and described for the purposes stated.

JAMES M. RANKIN.

Witnesses:
 B. R. BRYSON,
 F. J. OTTMAR.